United States Patent
Sano

(10) Patent No.: US 10,035,893 B2
(45) Date of Patent: Jul. 31, 2018

(54) BLOW-MOLDED FOAM AND METHOD OF FORMING THE SAME

(71) Applicant: Kyoraku Co., Ltd., Kyoto-Shi, Kyoto (JP)

(72) Inventor: Takeru Sano, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 0 days.

(21) Appl. No.: 15/027,581

(22) PCT Filed: Oct. 9, 2014

(86) PCT No.: PCT/JP2014/077115
§ 371 (c)(1),
(2) Date: Apr. 6, 2016

(87) PCT Pub. No.: WO2015/053377
PCT Pub. Date: Apr. 16, 2015

(65) Prior Publication Data
US 2016/0237232 A1    Aug. 18, 2016

(30) Foreign Application Priority Data

Oct. 10, 2013  (JP) ................................. 2013-212527
Jun. 27, 2014  (JP) ................................. 2014-133340

(51) Int. Cl.
| | | |
|---|---|---|
| *C08J 9/00* | (2006.01) | |
| *B29C 49/02* | (2006.01) | |
| *C08J 9/12* | (2006.01) | |
| *B29C 44/08* | (2006.01) | |
| *B29C 44/56* | (2006.01) | |
| *B29C 49/42* | (2006.01) | |
| *B29L 31/30* | (2006.01) | |
| *B29L 23/00* | (2006.01) | |
| *B29C 49/00* | (2006.01) | |
| *B29K 105/04* | (2006.01) | |
| *B29C 49/04* | (2006.01) | |

(52) U.S. Cl.
CPC ............... *C08J 9/122* (2013.01); *B29C 44/08* (2013.01); *B29C 44/56* (2013.01); *B29C 49/4268* (2013.01); *B29C 49/0005* (2013.01); *B29C 49/04* (2013.01); *B29C 2049/001* (2013.01); *B29K 2023/06* (2013.01); *B29K 2105/04* (2013.01); *B29L 2023/22* (2013.01); *B29L 2031/30* (2013.01); *B29L 2031/3032* (2013.01); *C08J 2323/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,107,377 A | * | 8/2000 | Nakamura | ............... C08K 5/13 264/171.23 |
| 6,221,925 B1 | * | 4/2001 | Constant | .................. C08J 9/00 521/149 |
| 6,733,705 B1 | | 5/2004 | Obara | |
| 2015/0045467 A1 | | 2/2015 | Sano et al. | |

FOREIGN PATENT DOCUMENTS

| | | | |
|---|---|---|---|
| DE | 3712973 A1 | | 11/1988 |
| EP | 1 116 571 A1 | | 7/2001 |
| JP | H09-213133 | * | 8/1997 |
| JP | 2002003663 A | | 1/2002 |
| JP | 2005241157 A | | 9/2005 |
| JP | 2007138150 A | | 6/2007 |
| JP | 2009262983 A | | 11/2009 |
| JP | 2010-121053 | * | 6/2010 |
| JP | 2010121054 A | | 6/2010 |
| JP | 2010260229 A | | 11/2010 |
| JP | 2011-052038 A | | 3/2011 |
| JP | 2011194700 A | | 10/2011 |
| JP | 2012136598 A | | 7/2012 |
| WO | WO2013/111692 A1 | | 8/2013 |

OTHER PUBLICATIONS

PCT International Search Report dated Nov. 25, 2015 issued in corresponding PCT International Application No. PCT/JP2014/077115.
Extended European Search Report dated May 15, 2017 issued in the corresponding European Patent Application No. 14852528.0.
Plastics Additives Handbook: (Original, Fifth Edition), by Hans Zweifel, Chemical Industry Press Second edition, Mar. 2005, p. 530, 14.9.4 Crosslinked Foam Plastics. (Cited in OA issued on Sep. 19, 2017 for the corresponding Chinese Patent Application No. 201480055036.8.).

* cited by examiner

*Primary Examiner* — Kara B Boyle
(74) *Attorney, Agent, or Firm* — Troutman Sanders LLP

(57) ABSTRACT

A blow-molded foam is provided by foaming and blow-molding the resin material including a polyethylene resin. The foamed resin includes the antioxidant by 300 ppm or more in total. The antioxidant is preferably the combination of a phosphorus antioxidant and a phenolic antioxidant. The optimum amount of phosphorus antioxidant to be included is 250 ppm to 3000 ppm, and that of phenolic antioxidant is 250 ppm to 750 ppm. In the manufacture, the collected resin material and the resin including 300 ppm or more of the antioxidant are melted and kneaded and the foaming agent is mixed thereto to provide the foamed resin, and the foamed resin is blow-molded.

12 Claims, 1 Drawing Sheet

BLOW-MOLDED FOAM AND METHOD OF FORMING THE SAME

CROSS REFERENCE TO RELATED APPLICATIONS

This application is a U.S. National Phase Application under 35 U.S.C. § 371 of International Patent Application PCT/JP2014/077115 filed Oct. 9, 2014, which claims priority to Japanese Patent Application Nos. 2013-212527, filed Oct. 10, 2013 and 2014-133340, filed Jun. 27, 2014. The entire contents of these applications are hereby incorporated by reference.

TECHNICAL FIELD

The present invention relates to a blow-molded foam and a method of forming the same, and particularly to a blow-molded foam including polyethylene as a resin material and a method of forming such a blow-molded foam.

BACKGROUND

Known examples of the blow-molded foam include a climate control duct provided in an instrument panel of a vehicle. The climate control duct often employs a foamed duct formed by molding the foamed resin material. The foamed duct is light in weight. Such a foamed duct can be manufactured easily in a manner that, for example, the resin material such as polyolefin resin including a foaming agent is melted and kneaded and then a foamed parison extruded out of a die of an extruder is blow-molded.

The resin material used for the blow-molded foam is often polyolefin resin. In particular, polypropylene resin is generally used. In recent years, using polyethylene resin alternatively has been examined for the purpose of reducing the material cost (see Japanese Unexamined Patent Publication No. 2011-194700 A).

Patent Literature 1 has disclosed the duct for vehicles, which is obtained by adding a chemical foaming agent to a mixed resin obtained by mixing high-density polyethylene with a long-chain branched structure, a specific gravity of 0.95 to 0.96, a melt flow rate (MFR) of 3 to 7 g/10 minutes, and a melt tensile force of 100 to 250 mN and high-density polyethylene with a melt flow rate (MFR) of 0.3 to 1.0 g/10 minutes, and then blow-molding the resulting mixture.

SUMMARY OF THE INVENTION

In regard to the blow-molded foam including the polyethylene resin, the optimization of the resin composition, the physical properties, etc. is insufficient as compared to the polypropylene resin. In the status quo, the development thereof has been delayed. However, the blow-molded foam including the foamed polyethylene has the high potential demand as compared to the blow-molded foam including the foamed polypropylene. This is why the development thereof has been anticipated.

From the aspect of the development of the blow-molded foam including the polyethylene resin as the foamed resin, the foamed resin including the polyethylene resin has a problem that a pin hole (or imperfect molding due to a pin hole) easily occurs. This problem is more remarkable in molding the highly foamed article and the article with the complicated shape. Another problem is that the production stable over a long period is impossible. Various examinations have been conducted in the conventional development in regard to the use of supercritical foaming agents, the use of the material with the high melt tensile force, the adjustment of the molding condition, etc. However, the satisfying solution has not been found yet.

The present invention has been made in view of such circumstances. An objective of the present invention is to provide a lightweight and inexpensive blow-molded foam with the excellent quality without a pin hole or the like and a method of forming the same. Another objective of the present invention is to provide a blow-molded foam that can be formed by recycling the used polyethylene resin, and a method of forming the same.

A blow-molded foam according to the present invention for achieving the above objective is a blow-molded foam formed by blow-molding a foamed resin including polyethylene. The blow-molded foam is featured in that the foamed resin includes an antioxidant, and the antioxidant is included by 300 ppm or more in total.

A method of forming a blow-molded foam according to the present invention is a method of forming a blow-molded foam which includes blow-molding a foamed resin including polyethylene. A collected resin material is mixed with an unused resin including an antioxidant of which amount is determined so that the antioxidant is added by 300 ppm or more in a blow-molded foam formed by blow-molding. The obtained mixture is melted and kneaded and furthermore, a foaming agent is mixed in this mixture; thus, a foamed resin is formed. A method of forming a blow-molded foam according to the present invention is featured in that the foamed resin is blow-molded.

A foamed duct according to the present invention is featured in that the foamed duct is formed of a resin including 300 ppm or more of antioxidant. The present inventor has focused on the characteristic of polyethylene, which is different from polypropylene. The present inventor has found out that the crosslinking deterioration of polyethylene by the thermal history, which has not been regarded as a problem in the conventional non-blow-molded foam, would cause the pin hole or the like in the blow-molded foam. The present inventor has solved the problems by adding a larger amount of antioxidant.

According to the present invention, the lightweight and inexpensive blow-molded foam with the excellent quality without a pin hole or the like can be provided. Moreover, according to the present invention, the used foamed polyethylene resin can be recycled. This can drastically improve the use efficiency of the polyethylene resin.

DETAILED DESCRIPTION OF THE INVENTION

An embodiment of a blow-molded foam according to the present invention will hereinafter be described with reference to the drawings. A foamed duct is taken as an example in the following description.

Figure 1:
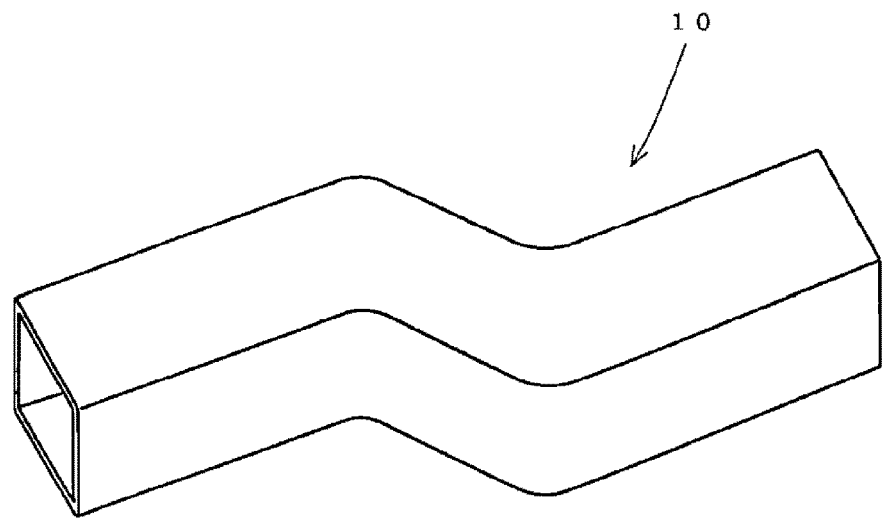
FIG. 1 is a schematic perspective view illustrating an example of a foamed duct.

A foamed duct 10 as a blow-molded foam is configured to let the conditioned air flow from an air-conditioner unit (not shown) to a desired portion along an inner flow path. The shape of the foamed duct 10 is not limited to the shape illustrated in FIG. 1. The shape may be arbitrarily determined in accordance with the intended purpose and the place to install.

The foamed duct 10 according to the embodiment can be obtained by having a foamed parison, which is formed by extruding a foamed resin from a die of an extruder, held in a mold and blow-molding the parison. The duct just after the blow-molding has opposite ends closed. After the blow-molding, the opposite ends are cut through trimming, thereby forming the open shape.

The foamed duct 10 according to the embodiment includes a hollow foamed resin molded article with a pipe wall formed by a foamed layer. The structure including the foamed layer with a closed cell structure enables to form the duct with the small weight and the excellent heat insulating property. The closed cell structure is the structure including a plurality of closed cells, and refers to a structure having a closed cell content of at least 70% or more. Such a structure hardly allows the dew condensation even if the cool air flows into the foamed duct 10.

The foamed duct 10 according to the embodiment includes a mixed resin as a base material resin. The mixed resin is obtained by mixing a collected resin material and an unused resin (virgin resin). The foamed duct 10 according to the embodiment can be obtained by adding a foaming agent to the base material resin and then blow-molding the mixture.

A resin molded article is formed by the blow-molding generally in the following manner: a resin material in a melted state is shaped along the mold surface, the resin material cooled and solidified is separated from the mold, and the burr around the molded article and the opening are cut away with a cutter or the like. In the manufacture cycle of the mass production with the blow-molding, the unnecessary part of the resin material that has been melted and solidified around the completed product are pulverized and then collected. The collected resin material is reused from the viewpoint of resource and cost saving. This collected resin material is mixed with virgin resin which has never been heated, so that the mixed resin is provided. A foaming agent is added to this mixed resin and then blow molding is performed again.

In such a manufacture cycle of the mass production, in some cases, the collected resin material constitutes as much as 70 to 90% of the resin material used in the molding. Specifically, for example, after the blow-molding, the collected resin material resulting from the blow-molding is extracted and virgin resin is added to the collected resin material by approximately 10 to 30% relative to the entire resin material of which amount corresponds to the amount extracted for the final foamed and molded article, thereby forming the mixed resin, and in the case of performing the blow-molding again with this mixed resin, the collected resin material constitutes 70 to 90%.

As described above, the manufacture cycle includes preparing the mixed resin by adding the virgin resin to the collected resin material resulted from the blow molding, and blow-molding the mixed resin again. As this manufacture cycle is repeated, the properties of the foamed article (foamed duct 10) formed by molding the mixed resin are often lower than the properties of the foamed article formed by molding the virgin resin only.

In particular, in the case of using the polyethylene resin as the resin material for the foamed duct 10, polyethylene is oxidized to deteriorate due to the thermal history repeatedly applied, resulting in the formation of the crosslinked substance. This leads a major problem that a pin hole detect occurs starting from the nucleus including the crosslinked substance of crosslinked polyethylene in the blow-molding. In particular, the defect occurs more remarkably if forming the foamed duct with an expansion ratio (value obtained by dividing the density of the resin by the apparent density including the cells) of 1.5 or more.

In view of this, the foamed duct 10 according to the embodiment employs the polyethylene resin as the foamed resin material and additionally includes a large amount of antioxidant, thereby suppressing the defect caused by the crosslinking deterioration. Description will hereinafter be made of the foamed resin material used for the foamed duct 10.

First, the polyethylene resin used for the foamed resin material is described. Polyethylene may be low-density polyethylene (LDPE), high-density polyethylene (HDPE), or linear low-density polyethylene (LLDPE). A copolymer of ethylene and another copolymerizable monomer may be used. In any case, polyethylene with a long-chain branched structure is preferably included. Using polyethylene with the long-chain branched structure improves the foaming property.

Polyethylene with the long-chain branched structure (hereinafter referred to as long-chain branched polyethylene) is, for example, long-chain branched polyethylene as disclosed in JP-A-2012-136598. Such long-chain branched polyethylene has a branched structure only at a terminal of a long polyethylene chain. Because of this structure, the long-chain branched polyethylene is featured in that the number of branched structures is fewer than that of normal polyethylene.

The long-chain branched polyethylene can be manufactured through ethylene polymerization with a catalyst including an organic aluminum compound and an organic modified clay mineral obtained by modifying clay mineral belonging to smectite group hectorite with a particular organic compound.

The long-chain branched polyethylene may have an arbitrary physical property. For example, the density thereof, which is defined by the value of the density measured based on JIS K7676, is preferably in the range of 925 to 970 kg/m$^3$, particularly preferably 930 to 960 kg/m$^3$. The long-chain branched polyethylene exhibits two peaks in the molecular amount measurement by GPC.

The ratio (Mw/Mn) of the weight-average molecular weight (Mw) of the long-chain branched polyethylene to the number-average molecular weight (Mn) thereof is 2.0 to 7.0, preferably 2.5 to 7.0, and more preferably 3.0 to 6.0. The number-average molecular weight (Mn) measured by GPC is preferably 15,000 or more, more preferably in the range of 15,000 to 100,000, and particularly preferably in the range of 15,000 to 50,000.

The number of long-chain branches of the long-chain branched polyethylene is preferably 0.02 or more per 1000 carbon atoms in the main chain. The number of long-chain branches of the fraction with an Mn of 100,000 or more, which is obtained by the fractionation based on the molecular weight, is 0.15 or more per 1000 carbon atoms in the main chain. The proportion of the fraction with an Mn of 100,000 or more, which is obtained by the fractionation based on the molecular weight, is desirably less than 40% of the entire polymer.

In the present invention, an antioxidant is added to the foamed resin material. The amount of antioxidant to be added needs to be set so that the polyethylene resin (foamed article) includes the antioxidant by 300 ppm or more in total, preferably 500 ppm or more in total. If the antioxidant is included by less than 300 ppm, the effect is insufficient, which may make it difficult to suppress the crosslinking deterioration over a long period of time.

The antioxidant may be any known antioxidant. Any of various kinds of antioxidants may be used alone or in combination with another. Note that the experiments of the present inventors have proved that the combination of particular antioxidants is effective. Description is hereinafter made of the combination of antioxidants.

The antioxidant includes an antioxidant that operates to capture a radical (first antioxidant), and an antioxidant that decomposes a peroxide (second antioxidant). Examples of the former (first antioxidant) include a phenolic antioxidant and a hindered amine compound (HALS). Examples of the latter (second antioxidant) include a phosphorus antioxidant and a sulfur antioxidant. The resin generates radicals by heat, light, or shear. If the generated radicals are left as they are, the crosslinking deterioration and oxidation deterioration occur and such deterioration results in the lower physical properties. The former (antioxidant that operates to capture a radical (first antioxidant)) operates to capture the generated radical. This operation prevents the crosslinking deterioration and the oxidation deterioration. On the other hand, the latter (antioxidant that decomposes the peroxide (second antioxidant)) operates to decompose the peroxide (radical) generated in the thermal oxidation into alcohol, thereby stopping the chain reaction to deterioration.

As described thus, both the first antioxidant and the second antioxidant are widely used for preventing the oxidation, though their functions are different. As a result of the examination by the present inventors, however, it has been turned out that these oxidants have some problems if added to the polyethylene resin.

For example, if only the antioxidant that decomposes the peroxide (second antioxidant) is added, performing the recycle test involving the thermal history increases the melt tensile force MT largely after the thermal history, i.e., the oxidation prevention effect tends to be insufficient. The melt tensile force MT, which is the parameter observed in the oxidation deterioration, is large. That is to say, the pin hole is formed in the molding because of the foreign substance from the oxidation deterioration.

On the other hand, if only the antioxidant (first oxidant) that operates to capture a radical is added, performing the recycling test involving the thermal history results in the lower melt tensile force MT after the thermal history because of the influence from the antioxidant. It has been turned out that the addition in large amount of 500 ppm or more leads to a problem of lower melt tensile force MT. The lower melt tensile force MT causes the parison to fail to follow if the blow ratio in the blow molding is high. In this case, the pin hole is easily formed.

These findings have concluded that the combination of the first antioxidant and the second antioxidant provides the sufficient oxidation prevention effect and that the change amount of the melt tensile force MT can be minimized by offsetting the decrease in melt tensile force MT, which would occur if only the first antioxidant were added, by the addition of the second antioxidant.

Thus, in the embodiment of the present invention, it is preferable to employ the combination of the antioxidant (first antioxidant) that operates to capture a radical and the antioxidant (second antioxidant) that decomposes the peroxide. This leads to the sufficient oxidation prevention effect and the suppressed deterioration in physical property.

The first antioxidant may be any of the aforementioned phenol antioxidant and hindered amine compound (HALS). The phenolic antioxidant is particularly preferable. The second antioxidant may be, for example, a phosphorus antioxidant or a sulfur antioxidant. The phosphide antioxidant is preferable. The phenolic antioxidant and the phosphorus antioxidant are excellent in practicability because these are easily accessible and stably supplied and have high purity. The phosphorus antioxidant has other features of the excellent resistance against hydrolysis and vaporization. The phenolic antioxidant is effective in improving the resistance of various kinds of resins and elastomers against heat. Since the phenolic antioxidant has high molecular weight, the phenolic antioxidant has features of low extraction and low vaporization.

As described thus, using the phosphorus antioxidant and the phenolic antioxidant in combination provides the additional effect. This can effectively suppress the crosslinking deterioration and the oxidation deterioration of the polyethylene resin, and moreover suppress the change in melt tensile force MT and the like in the recycling.

The phosphorus antioxidant and the phenolic antioxidant may be any known antioxidant. For example, the phosphorus antioxidant includes a high-molecular phosphorus antioxidant and a low-molecular-weight phosphorus antioxidant. Any one of them may be used alone, or both may be mixed to be used.

Specific examples of the high-molecular phosphorus antioxidant include tris(2,4-branched C3-8alkyl-butylphenyl) phosphite (such as tris(2,4-di-t-butylphenyl)phosphite), and tetrakis(2,4-di-branched C3-8alkylphenyl)-4,4'-C2-4alkylene phosphite such as tetrakis(2,4-di-t-butylphenyl)-4,4'-biphenylene phosphite. An example of the commercial high-molecular phosphorus antioxidant is a product "Irgafos168" of CIBA JAPAN.

Examples of the low-molecular-weight phosphorus antioxidant include triphenyl phosphite, diphenyl isodecyl phosphite, phenyl diisodecyl phosphite, tris(nonylphenyl) phosphite, and phosphine compounds such as tri-2,4-dimethylphenyl phosphine, tri-2,4,6-trimethylphenyl phosphine, tri-o-tolyl phosphine, tri-m-tolyl phosphine, tri-p-tolyl phosphine, tri-o-anisyl phosphine, and tri-p-anisyl phosphine.

The phenolic antioxidant includes a high-molecular phenolic antioxidant and a low-molecular-weight phenolic antioxidant. Any one of them may be used alone, or both may be mixed to be used.

An example of the high-molecular phenolic antioxidant is a hindered phenol compound. Examples of the hindered phenol compound include tris(2-alkyl-4-hydroxy-5-branched C3-8alkylphenyl)butane such as 1,1,3-tris(2-methyl-4-hydroxy-5-t-butylphenyl)butane, tris(3,5-di-branched C3-8alkyl-4-hydroxybenzyl)benzene such as 1,3,5-trimethyl-2,4,6-tris(3,5-di-t-butyl-4-hydroxybenzyl)benzene, 1,3,5-trialkyl-2,4,6-tris(3,5-di-branched C3-8alkyl-4-hydroxybenzyl)benzene such as 1,3,5-trimethyl-2,4,6-tris(3,5-di-t-butyl-4-hydroxybenzyl)benzene, tetrakis[alkylene-3-(3,5-di-branched C3-8alkyl-4-hydroxyphenyl)propionate]C1-4alkane such as tetrakis[methylene-3-(3,5-di-t-butyl-4-hydroxyphenyl)propionate]methane, and pentaerythrityltetrakis[3-(3,5-di-branched C3-8alkyl-4-hydroxyphenl)propionate] such as pentaerythrityltetrakis[3-(3, 5-di-t-butyl-4-hydroxyphenl)propionate]. An example of the commercial high-molecular phenolic antioxidant is a product "Irganox1010" of CIBA JAPAN.

Examples of the low-molecular-weight phenolic antioxidant include: monophenolic compounds such as dibutylhydroxytoluene (BHT), butylated hydroxy anisole (BHA), 2,6-di-t-butyl-p-cresol, 2,6-di-t-butyl-4-ethylphenol, 2,6-dit-butylphenol, 2,4-dimethyl-6-t-butylphenol, 2-methyl-4,6-di-nonylphenol, butylhydroxyanisole, styrenated phenol, 2,4,6-tri-t-butylphenol, and 4,4'-dihydoxydiphenyl; bisphenolic compounds such as 2,2'-methylenebis(4-methyl-6-t-butylphenol), 2,2'-methylenebis(4-ethyl-6-t-butylphenol), 4,4'-butylidenebis(3-methyl-6-t-butylphenol), 4,4'-butylidenebis(2,6-di-t-butylphenol), 1,1'-bis(4-hydroxyphenyl)cyclohexane, and 2,2'-dihydroxy-3,3'-di(a-methylcyclohexyl)-5,5'-dimethyldiphenylmethane; hydroquinone compounds such as 2,5-di-t-butylhydroquinone, hydroquinone monomethylether, and 2,5-di-(tertiary amyl)hydroquinone; and hindered phenolic compounds such as n-octadecyl-3-(4'-hydroxy-3',5'-di-t-butylphenol)propionate.

Moreover, the low-molecular-weight phenolic antioxidant includes a metal deactivator such as a hydrazine compound with a hindered phenol structure such as {N,N'-bis[3-(3,5-di-t-butyl-4-hydroxyphenyl)propionyl]hydrazine}.

The amount of phenolic antioxidant and phosphorus antioxidant to be added needs to be set so that the total amount of antioxidants to be included is 300 ppm or more. In addition, the amount of each antioxidant to be added is optimized. Specifically, the amount of phenolic antioxidant to be included is preferably in the range of 250 ppm to 750 ppm. The amount of phosphorus antioxidant to be included is preferably in the range of 250 ppm to 3000 ppm.

The molded foam of the polyethylene resin including the phenolic antioxidant and phosphorus antioxidant in the above range can have the excellent recyclability and moldability. In particular, the change in the physical properties before and after the thermal history (melt tensile force MT and melt flow rate MFR) can be suppressed, which is effective in recycling the polyethylene resin.

Specifically, adding the phenolic antioxidant and phosphorus antioxidant in predetermined amount can suppress the change ratio of the melt flow rate MFR in the range of 5% or less. Specifically, the change ratio of the melt flow rate MFR refers to the change ratio after three thermal histories each performed using the resin material (resin material including polyethylene as raw material) including the antioxidant relative to the melt flow rate MFR after one thermal history. If the melt flow rate MFR has increased by over +5%, it means that the resin is getting decomposed. This possibly results in the drawdown or makes the resin fragile. On the contrary, if the melt flow rate has decreased by over −5%, it means that the resin is in the situation that oxidation deterioration has occurred. This possibly leads to the pin hole defect caused by the foreign substance from the oxidation deterioration.

Similarly, adding the phenolic antioxidant and phosphorus antioxidant in predetermined amount can suppress the change ratio of the melt tensile force MT within a range of −5% to 0%. The change ratio of the melt tensile force MT refers to the change ratio after three thermal histories each performed using the resin material relative to the melt tensile force MT after one thermal history. If the melt tensile force MT has increased by over 0%, it means that the resin is in the situation that oxidation deterioration has occurred. This possibly leads to the pin hole defect caused by the foreign substance from the oxidation deterioration. On the contrary, if the melt tensile force MT has decreased by over −5%, the molten resin fails to follow the expansion in the blow molding. This possibly fails to form a thin portion or causes the drawdown.

In regard to the optimum value (intermediate value) of the melt tensile force MT of this material mixture, the value of the resin material including the antioxidants after one thermal history and the value thereof after three thermal histories are both 180 mN. The resin material with a value apart from 180 mN by ±10 mN or more is determined as having an adverse influence on the foam-molding cyclability. For example, if the melt tensile force MT is more than 190 mN (180 mN+10 mN), the molding temperature needs to be set high. The high molding temperature may make it difficult to form a complicated shape. On the contrary, if the melt tensile force MT is less than 170 mN (180 mN−10 mN), the drawdown is increased. This may fail the molding with large thickness. The thin portion may have a pin hole.

In regard to the thermal history, the virgin resin including the antioxidants in a melted state is extruded from a predetermined extruder under a condition shown below, and then solidified; thus, the sample with one thermal history is obtained. The specific extrusion condition is as follows: an extruder with a screw inserted, the screw having a diameter of 25 mm and an L/D of 20, is used; the number of rotation of the screw is set to 60 rpm; the extrusion port has a slit-like shape of 25 mm×1 mm; and the temperature inside the extruder is adjusted to approximately 200 to 210° C. so that the resin is extruded by approximately 3 kg/h. The sheet-shaped extruded resin is cooled to be solidified between metal plates. After the sample with one thermal history is obtained, all the solidified resin material is pulverized without adding the virgin resin; thus, the collected resin material is prepared. Only this collected resin material in the melted state is extruded from the aforementioned extruder under the same condition and solidified through the same procedure; thus, the sample with two thermal histories is obtained. After the sample with the two thermal histories is obtained, the entire solidified resin material is pulverized without adding the virgin resin; thus, the collected resin material is prepared. Only this collected resin material in the melted state is extruded from the aforementioned extruder under the same condition and solidified through the same procedure; thus, the sample with three thermal histories is obtained.

The amount of antioxidant described above corresponds to the amount of antioxidant included in the blow-molded foam as the final product (here, the foamed duct 10). The amount of antioxidant included in the molded foam is, for example, determined by the quantitative analysis based on, for example, a liquid chromatography. The antioxidant is a pure chemical, so that there is a particular holding time (varying depending on the kind of developing medium and column, which is determined based on the standard substance). The area and the height of the peak are in proportion to the concentration. Thus, the concentration can be known if the calibration curve is formed with the standard sample in advance. In the case of the phenolic antioxidant and the phosphorus antioxidant, the molded foam as the final product includes the antioxidants in the same amount as the amount thereof added in the manufacture.

In the manufacture of the molded foam, the polyethylene resin with the phosphorus antioxidant and the phenolic antioxidant added is blow-molded. In the blow-molding, the foaming agent is used to foam the polyethylene and the foamed polyethylene is molded. The foaming agent may be an inorganic foaming agent such as air, carbonic acid gas, nitrogen gas, or water, or an organic foaming agent such as butane, pentane, hexane, dichloromethane, or dichloroethane. Among these, the foaming agent is preferably air, carbonic acid gas, or nitrogen gas. By using any of these, the mixing of organic matters can be prevented and the decrease in durability can be suppressed.

A method of foaming preferably employs a supercritical fluid. That is to say, the carbonic acid gas or nitrogen gas in a supercritical state is preferably used to foam the polyethylene resin. Using the supercritical fluid assures the uniform foaming. If the supercritical fluid is nitrogen gas, the condition may be as follows: the critical temperature is −149.1° C. and the critical pressure is 3.4 MPa. If the supercritical fluid is carbonic acid gas, the condition may be set as follows: the critical temperature is 31° C. and the critical pressure is 7.4 MPa.

Figure 2:
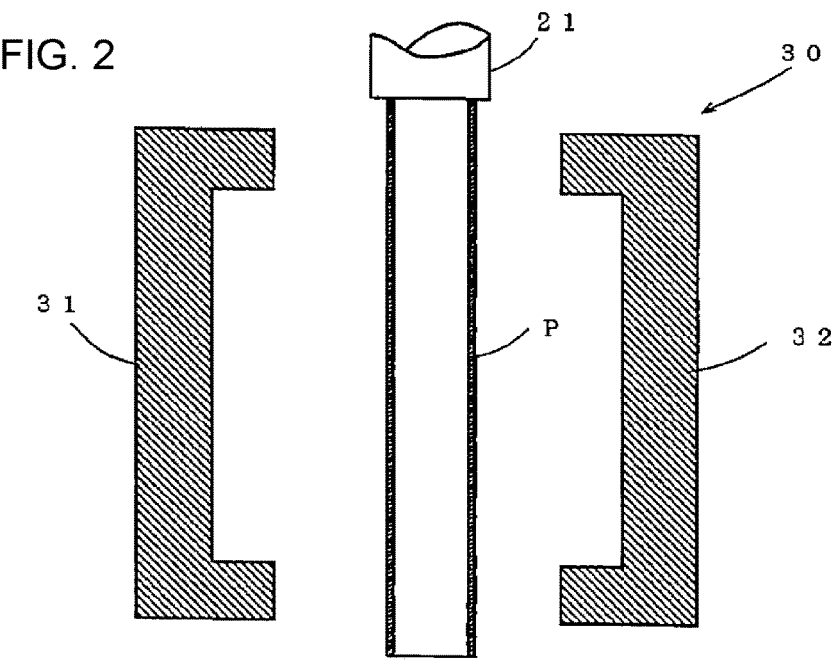
FIG. 2 is a schematic sectional view illustrating how to form the duct through the blow-molding.

The thusly foamed polyethylene resin is blow-molded by a known method, thereby forming the foamed duct 10. FIG. 2 is a diagram illustrating how to form the foamed duct 10 by blow-molding.

In the blow-molding, first, the resin material (polyethylene resin) to be used in the molding is kneaded in the extruder to manufacture the base material resin. If only the virgin resin (unused resin) is used in the molding, the virgin resin of the polyethylene resin including a modifier added as necessary is kneaded to manufacture the base material resin. In the case of using the collected resin material, the pulverized collected resin material including the virgin resin added in a predetermined proportion is kneaded to manufacture the base material resin.

In the former case (molding with the virgin resin only), the antioxidant is added to the virgin resin as the raw material and the amount of the antioxidant is determined so that the total amount of antioxidant in the blow-molded foam is the aforementioned amount. In the latter case (using the collected resin material), the antioxidant is added in advance to the virgin resin, and the amount of the antioxidant is the aforementioned amount (for example, 300 ppm or more) in the blow-molded foam. The virgin resin including the antioxidant and the collected resin material are mixed and melted and kneaded. Further, the foaming agent is mixed to prepare the foamed resin. The foamed resin is blow-molded.

The base material resin with the foaming agent added thereto is mixed in the extruder and then accumulated in an in-die accumulator (not shown). Subsequently, after a predetermined amount of resin is accumulated, the resin is pressed down in a direction orthogonal to the horizontal direction (vertical direction) by a ring-shaped piston (not shown). Then, the base material resin is extruded as a cylindrical parison P between split mold blocks 31 and 32 included in a clamping machine 30 from a die slit of an annular die 21 illustrated in FIG. 2 at an extrusion speed of 700 kg/h or more. After that, the split mold blocks 31 and 32 are clamped with the parison P between the blocks 31 and 32. In addition, air is blown into the parison P at a pressure ranging from 0.05 to 0.15 MPa. Thus, the foamed duct 10 is formed.

The molded resin material is cooled and solidified and a part thereof other than the completed product is pulverized. The pulverized material is collected to provide the collected resin material. The virgin resin is added to the collected resin material in a predetermined proportion. With the obtained mixed resin, the blow molding is similarly performed again. Repeating such a manufacture cycle can produce a large amount of foamed ducts 10.

The method of molding the foamed duct 10 is not limited to the aforementioned blow-molding. The vacuum molding that vacuums the extruded parison onto the mold to form the article with a predetermined shape may be employed alternatively. Another molding is the compression molding requiring neither the air blowing nor vacuuming but having the extruded parison held between the mold blocks.

As described above, the foamed duct according to the present invention has fewer defects from the crosslinking deterioration, which has conventionally been a problem unique to the polyethylene resin. This can provide the foamed duct with the excellent quality and reliability. In the case of using the used polyethylene resin, the deterioration problem can also be solved. Thus, the recycling system can be established. Moreover, the virgin resin can be selected from less expensive materials (polyethylene), so that the further cost reduction is possible.

The present invention has been described so far based on the embodiment. However, the present invention is not limited to the embodiment above, and various changes can be made within the scope not departing from the content of the present invention.

EXAMPLES

Specific examples of the present invention will be described based on the experiment results.

Experiment 1

Example 1

High-density polyethylene (HDPE) for 40 parts by weight and long-chain branched polyethylene (product name: 08S55A, TOSOH CORPORATION) for 60 parts by weight were mixed. To this mixture, a recycled material (collected resin material) was mixed and kneaded to provide a base material resin. With the base material resin, a foamed duct with an expansion ratio of 2.0 was formed through blow-molding. In the base material resin, 240 ppm of phosphorus antioxidant (product name: Irgafos168, CIBA JAPAN) and 160 ppm of phenolic antioxidant (product name: Irganox1010, CIBA JAPAN) were added. The proportion of the recycled material (collected resin material) relative to the base material resin was set to 85% in weight ratio.

Example 2

A foamed duct was molded through blow-molding in the same procedure as Example 1 except that the phosphorus antioxidant was added by 600 ppm.

Example 3

A foamed duct was molded through blow-molding in the same procedure as Example 1 except that the phosphorus antioxidant was added by 750 ppm.

Comparative Example 1

A foamed duct was molded through the same procedure as Example 1 except that the antioxidant was not added.
(Evaluations)

The imperfect molding due to the pin hole was not observed in Examples 2 and 3. In Example 1, the imperfect molding due to the pin hole was not observed even after the continuous molding for one week but the pin hole defect was a little seen after one week.

On the other hand, in the comparative example where the antioxidant was not added, the imperfect molding was observed in one cycle. The above facts indicate that it is effective to add the antioxidant by 300 ppm or more. The preferable amount of antioxidant to prevent the defective molding for a long time is 500 ppm or more.

Experiment 2

Experiment 2 was intended to examine the optimum amount of phenolic antioxidant and phosphorus antioxidant to be added.

The polyethylene resin used in the experiment was obtained by blending low-density polyethylene LDPE (product name: G201, Sumitomo Chemical Co., Ltd.) and high-density polyethylene HDPE (product name: B971, Asahi Kasei Corporation) by 50/50. To this polyethylene resin, the antioxidants were added in amount as shown in Table 1. The foamed duct was blow-molded through the same procedure as Experiment 1.

The amount of included antioxidant is measured as below. First, 100 g of sample was cut out of the foamed duct. Out of the chopped sample, the antioxidant was extracted using the organic solvent. The extracted antioxidant was developed by liquid chromatography (LC) using the selected appropriate developing medium and column. The holding time, peak area and peak height were measured. The standard substance for each antioxidant was obtained. The calibration curve was formed using the standard substance and by applying this curve to the measurement results, the concentration of the antioxidant was obtained.

Liquid chromatography measurement condition:
organic solvent: cyclohexane·2-propanol mixed solution (1:1)
developing medium used in stationary placement at 40° C. for 24 hours: acetonitrile
detector: HITACHI L-4200 column, Mightysil RP-18PA 4.6 mm×150 mm, 5 μm column temperature: 50° C.

The melt tensile force MT and the melt flow rate MFR of the foamed duct after the thermal history were measured. From the measurement values, the change ratio was calculated and the results are also shown in Table 1. Table 1 shows the thermal history 1, which corresponds to the measurement value of the polyethylene resin (virgin resin) melted and extruded once. The thermal history 3 corresponds to the measurement value of the polyethylene resin subjected to two more melting and extruding after the thermal history 1. The melt flow rate MFR was measured under the condition of 190° C., 2.16 kg, and g/10 min.

TABLE 1

| | Antioxidant | | Melt tensile force MT (mN) | | | MFR (190° C. 2.16 kg g/10 min) | | |
|---|---|---|---|---|---|---|---|---|
| No. | Phosphorus (ppm) | Phenolic (ppm) | Thermal history 1 | Thermal history 3 | Change ratio (%) | Thermal history 1 | Thermal history 3 | Change ratio (%) |
| (1) | 0 | 0 | 285.9 | 301.2 | 5.4 | 0.33 | 0.23 | −30.3 |
| (2) | 100 | 0 | 210.7 | 259 | 22.9 | 0.34 | 0.27 | −20.6 |
| (3) | 250 | 0 | 197.3 | 260.8 | 32.2 | 0.37 | 0.29 | −21.6 |
| (4) | 500 | 0 | 210.9 | 249.4 | 18.3 | 0.35 | 0.3 | −14.3 |
| (5) | 750 | 0 | 214.5 | 271.7 | 26.7 | 0.38 | 0.31 | −18.4 |
| (6) | 1000 | 0 | 201 | 220.3 | 9.6 | 0.37 | 0.35 | −5.4 |
| (7) | 3000 | 0 | 159.5 | 158.2 | −0.8 | 0.333 | 0.335 | 0.6 |
| (8) | 5000 | 0 | 130.4 | 126.6 | −2.9 | 0.3 | 0.308 | 2.7 |
| (9) | 0 | 100 | 188.5 | 178.8 | −5.1 | 0.4 | 0.379 | −5.3 |
| (10) | 0 | 250 | 187.8 | 177.2 | −5.6 | 0.371 | 0.366 | −1.3 |
| (11) | 0 | 500 | 185.8 | 153.6 | −17.3 | 0.36 | 0.353 | −1.9 |
| (12) | 0 | 750 | 178.3 | 155.4 | −12.8 | 0.331 | 0.33 | −0.3 |
| (13) | 0 | 1000 | 178.9 | 168.6 | −5.8 | 0.293 | 0.257 | −12.3 |
| (14) | 0 | 3000 | 174.5 | 161.7 | −7.3 | 0.293 | 0.257 | −12.3 |
| (15) | 0 | 5000 | 149.6 | 148.6 | −0.7 | 0.206 | 0.194 | −5.8 |
| (16) | 100 | 100 | 183.5 | 187.7 | 2.3 | 0.402 | 0.386 | −4.0 |
| (17) | 100 | 250 | 181.6 | 186.4 | 2.6 | 0.377 | 0.384 | 1.9 |
| (18) | 100 | 500 | 184.7 | 163.8 | −11.3 | 0.379 | 0.36 | −5.0 |
| (19) | 100 | 750 | 177.9 | 165.4 | −7.0 | 0.368 | 0.35 | −4.9 |
| (20) | 100 | 1000 | 177.3 | 161.4 | −9.0 | 0.359 | 0.344 | −4.2 |
| (21) | 250 | 100 | 186.4 | 187.6 | 0.6 | 0.378 | 0.399 | 5.6 |
| (22) | 250 | 250 | 189 | 182.2 | −3.6 | 0.372 | 0.363 | −2.4 |
| (23) | 250 | 500 | 183.9 | 176.7 | −3.9 | 0.363 | 0.37 | 1.9 |
| (24) | 250 | 750 | 181.7 | 174.6 | −3.9 | 0.37 | 0.367 | −0.8 |
| (25) | 250 | 1000 | 175.8 | 168.9 | −3.9 | 0.365 | 0.355 | −2.7 |
| (26) | 500 | 100 | 182.9 | 183.3 | 0.2 | 0.38 | 0.38 | 0.0 |
| (27) | 500 | 250 | 189.7 | 182 | −4.1 | 0.36 | 0.35 | −2.8 |
| (28) | 500 | 500 | 182.3 | 178.9 | −1.9 | 0.354 | 0.34 | −4.0 |
| (29) | 500 | 750 | 178.1 | 177.4 | −0.4 | 0.36 | 0.359 | −0.3 |
| (30) | 500 | 1000 | 175.6 | 169.4 | −3.5 | 0.358 | 0.355 | −0.8 |
| (31) | 750 | 100 | 188.2 | 189.2 | 0.5 | 0.34 | 0.34 | 0.0 |
| (32) | 750 | 250 | 188.2 | 179.5 | −4.6 | 0.33 | 0.34 | 3.0 |
| (33) | 750 | 500 | 184.3 | 175.9 | −4.6 | 0.331 | 0.33 | −0.3 |
| (34) | 750 | 750 | 178.8 | 173.8 | −2.8 | 0.335 | 0.336 | 0.3 |
| (35) | 750 | 1000 | 178.3 | 167.8 | −5.9 | 0.329 | 0.33 | 0.3 |
| (36) | 1000 | 250 | 184.5 | 185.3 | 0.4 | 0.36 | 0.363 | 0.8 |
| (37) | 1000 | 500 | 186.7 | 177.9 | −4.7 | 0.335 | 0.34 | 1.5 |
| (38) | 1000 | 750 | 182.7 | 176.7 | −3.3 | 0.332 | 0.335 | 0.9 |
| (39) | 1000 | 1000 | 177.3 | 169.2 | −4.6 | 0.332 | 0.328 | −1.2 |
| (40) | 3000 | 500 | 176.4 | 173.2 | −1.8 | 0.316 | 0.32 | 1.3 |
| (41) | 3000 | 750 | 172.1 | 170.2 | −1.1 | 0.32 | 0.322 | 0.6 |
| (42) | 5000 | 500 | 127.5 | 125.2 | −1.8 | 0.291 | 0.292 | 0.3 |

As is clear from Table 1, all the requirements: the change ratio of melt flow rate MFR in the range of ±5% or less, the change ratio of melt tensile force MT from −5% to 0%, and the melt tensile force MT of 180 mN±10 mN are achieved when the phosphorus antioxidant is 250 ppm to 3000 ppm and the phenolic antioxidant is 250 ppm to 750 ppm, i.e., No. 22, 23, 24, 27, 28, 29, 32, 33, 34, 36, 37, 38, 40, and 41.

On the other hand, for example, in No. 2 to 7 where only the phosphorus antioxidant is added, the increase in melt tensile force MT and the decrease in melt flow rate MFR in the thermal history 3 are large. In these cases, the above requirements are not satisfied. Similarly, in No. 8 to 13 where only the phenolic antioxidant is added, the decrease in melt tensile force MT in the thermal history 3 is observed.

The invention claimed is:

1. A blow-molded foam formed by foaming and blow-molding a foamed resin,
   wherein the foamed resin comprises a polyethylene resin and an antioxidant,
   wherein the antioxidant comprises 250 to 750 ppm of a phenolic antioxidant and 250 to 3000 ppm of a phosphorus antioxidant both in combination relative to the polyethylene resin; and
   wherein the polyethylene resin is the only polymer resin in the foamed resin.

2. The blow molded foam according to claim 1, wherein the phenolic antioxidant operates to capture a radical and the phosphorus antioxidant decomposes a peroxide.

3. The blow-molded foam according to claim 1, wherein a change ratio of a melt flow rate of the resin material including the antioxidant after three thermal histories relative to a melt flow rate thereof after one thermal history is 5% or less.

4. The blow-molded foam according to claim 1, wherein a change ratio of a melt tensile force MT of the resin material including the antioxidant after three thermal histories relative to a melt tensile force MT thereof after one thermal history is −5% to 0%.

5. The blow-molded foam according to claim 4, wherein a value of the melt tensile force MT of the resin material including the antioxidant after one thermal history and the value thereof after three thermal histories are both 180 mN±10 mN.

6. The blow-molded foam according to claim 1, wherein the blow-molded foam is a climate control duct for vehicles.

7. A method of forming a blow-molded foam by foaming and blow-molding a foamed resin comprising a polyethylene resin and an antioxidant, the method comprising:
   adding the antioxidant, in advance to an unused resin, comprising the steps of:
      adding 250 to 750 ppm of a phenolic antioxidant; and
      adding 250 to 3000 ppm of a phosphorus antioxidant;
      wherein the addition of both the phenolic antioxidant and the phosphorus antioxidant are in combination relative to the polyethylene resin;
   mixing the unused resin with a collected resin material and melting and kneading the mixture;
   mixing a foaming agent to the mixture to prepare a foamed resin; and
   blow-molding the foamed resin,
wherein the polyethylene resin is the only polymer resin in the foamed resin.

8. The method of forming a blow-molded foam according to claim 7, wherein the phenolic antioxidant operates to capture a radical and the phosphorus antioxidant decomposes a peroxide.

9. The method of forming a blow-molded foam according to claim 7, wherein the collected resin material comprises 70% or more and 90% or less relative to the weight of the foamed resin.

10. The blow-molded foam according to claim 1, wherein the polyethylene resin contains a polyethylene resin having a long-chain branched structure.

11. The blow-molded foam according to claim 1, wherein the polyethylene resin contains a high density polyethylene.

12. The blow-molded foam according to claim 10, wherein the polyethylene resin contains 40 parts by weight of a high density polyethylene and 60 parts by weight of a long chain branched polyethylene.

* * * * *